Patented Apr. 2, 1940

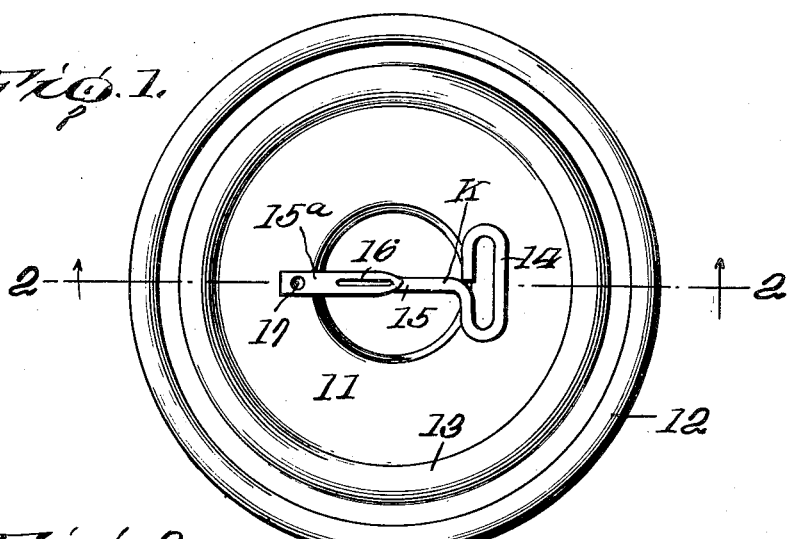
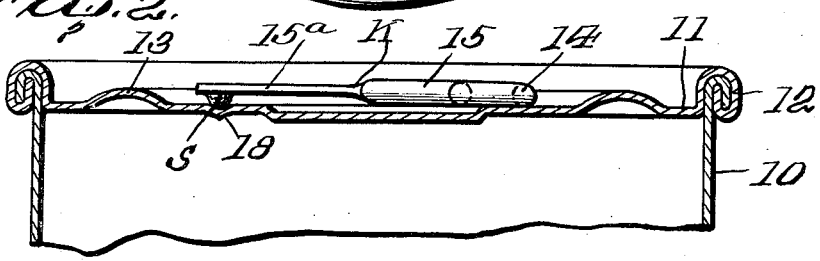
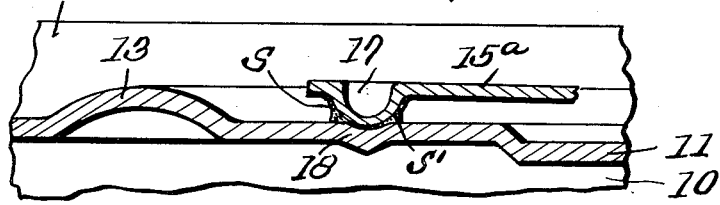
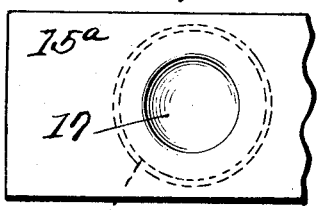
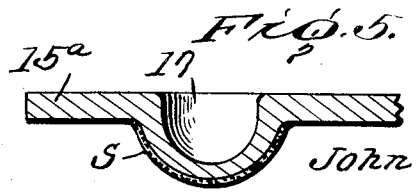

2,195,767

UNITED STATES PATENT OFFICE 2,195,767

KEY OPENING CONTAINER

John Coyle, Baltimore, Md., assignor to Continental Can Company, Inc., New York, N. Y., a corporation of New York Application April 4, 1938, Serial No. 200,022

3 Claims. (Cl. 220—52)

The present invention relates to new and useful improvements in a key opening container of the type including a rip or tearing strip with which a key is engageable for opening the container, and more particularly to improved means for attaching the key to the container.

It is a common expedient in the container art to provide a portion of a container with score lines defining a tearing strip, and with a projecting tongue portion which may be wound on a key so as to permit opening of the container by removing that portion of the container within the score lines. Thus, the score lines have been provided on the body wall of the container near the end so that removal of the tearing strip will release the entire container end. It is also a common expedient to provide means for attaching the key to the end of the container so that it may be readily detached therefrom and used for removing the tearing strip. The key has been secured to the container in various ways, as by welding and by soldering.

The heat necessary for securing the key to the container end, whether by welding or by soldering, often results in a marked discoloration or scorching of the inside of the container around the area where the key is attached thereto. In attaching keys to containers having a lacquered interior surface, it has been found that the necessary application of heat in welding or soldering the key to the container results in the scorching of the lacquered surface. This objection is particularly noticeable when the keys are secured to the container by welding. It is, of course, necessary and desirable to prevent damage to the lacquered surface of the container when the key is attached thereto.

An object of the present invention is to provide a key opening container of the above type, wherein the key is solder bonded to the container in such a manner that there is no discoloration or scorching of the interior surface thereof.

A further object of the invention is to provide a key opening container of the above type, wherein the portion of the key which is secured to the container is reduced in thickness and shaped to carry a pre-determined amount of solder so as to effect a neat solder bond between the key and the container.

A still further object of the invention is to provide a container of the above type, wherein the portion of the key which is secured to the container is of a thickness less than the thickness of the adjacent wall of the container so that relatively little heat will quickly penetrate the relatively thin portion of the key to melt the solder without scorching or discoloring the adjacent interior surface of the container.

The above and other objects of the invention will in part be obvious, and will be hereinafter more fully pointed out.

In the accompanying drawing,

Figure 1 is a top plan view showing a container with an opening key attached to the end thereof.

Figure 2 is an enlarged fragmentary view, in section, taken along the line 2—2 of Figure 1.

Figure 3 is a further enlarged detailed view, in section, showing the end of the key which is secured to the container.

Figure 4 is a further enlarged fragmentary plan view showing one end of the opening key.

Figure 5 is a side view, in section, of Figure 4.

Referring more in detail to the accompanying drawing, the container is illustrated as being in the form of a cylindrical sheet metal can having a body wall 10 and an end 11. The container end is secured to the body wall by the usual double seam 12. The container end is provided with an annular raised portion 13 which defines a central depression for receiving the opening key K.

The key K is formed from a piece of wire and is bent to provide a handle portion 14 and a shank portion 15. The free end 15a of the shank portion 15 is flattened and provided with a slot 16 through which the tongue of the tearing strip (not shown) is adapted to extend when it is desired to open the container.

The free end of the flattened portion 15a of the shank is shaped to form in one face thereof a small depression which provides on the opposite face thereof a depending boss or projection 17, the outer surface of which is curved, as clearly shown in Figures 3 and 5. The wall of this projection 17 is materially reduced in thickness. When the boss is formed on the portion 15a of the key, the thickness of the metal is reduced so that it is substantially thinner than the adjacent portion of the container end 11. When heat is applied to the inner surface of the boss 17, it will quickly penetrate the relatively thin wall portion without penetrating the adjacent wall portion of the container end. It is to be particularly noted that the major portion of the key is spaced above the container and so that moisture will not accumulate between the key and the container when leaving the process kettle. This construction guards against any tendency toward corrosion.

The outer surface of the boss 17 carries a coating of solder S. Thus, a pre-determined and relatively small amount of solder is employed. When the key is attached to the container end, light pressure is necessary to hold the key in place. This relatively light pressure forms a slight depression 18 in the container end, as shown in Figure 3. Heat is applied to the inner surface of the boss 17 and penetrates through the relatively thin wall portion thereof to melt the solder. When the solder melts, it flows downwardly and provides a ring portion S' for holding the key on the container end. The depressed portion 18 in the container end affords, with the adjacent end of the boss 17, a relatively large area for effecting the solder bond between the key and the container end. Thus, a large soldering area is afforded without the necessity of employing a greater amount of solder on the face of the boss 17.

From the foregoing description, it will be seen that the present invention provides a key opening container wherein the key is soldered to the end thereof in such a manner that the heat necessary to effect the solder bond will not scorch or otherwise damage the adjacent interior surface of the container. A portion of the key K is depressed and reduced in thickness so that the wall portion thereof is substantially thinner than the adjacent wall portion of the container end. A pre-determined and relatively small mount of solder is carried on the under surface of the depressed portion so that, when heat is applied thereto, the solder will flow downwardly and form a holding ring between the depressed portion and the container end. Thus, a neat and efficient solder bond is afforded between the key and the container. The relatively thin wall portion on the key permits a rapid penetration of heat therethrough to effect the solder bond. Thus, only a small amount of heat is necessary, and because of the substantial reduction of the thickness of this portion of the key, the heating means need only be applied for a short period. By this construction of the key, the heat will quickly effect the solder bond and the relatively thick adjacent wall portion of the container end will prevent the heat from penetrating through to the interior lacquered surface of the container. Thus, the lacquered surface is prevented from being scorched or otherwise damaged.

It is to be clearly understood that various changes in the details of construction and arrangement of parts may be made without departing from the scope of the invention as set forth in the appended claims.

I claim:

1. A key opening container including a closure end secured to the body wall, a key for opening the container and adapted to be secured to said end, said key having a depending rounded boss of a thickness substantially less than the thickness of the adjacent wall of the closure end, and solder carried on the rounded under surface of said boss, the rounded surface of said boss causing the solder to flow downwardly upon the application of heat so as to effect a ring-like solder bond between the key and the closure end.

2. A key opening container including a closure end secured to the body wall, a key for opening the container and adapted to be secured thereto, said key having in one face thereof a small depressed portion providing on the opposite face thereof a small depending projection of a reduced wall thickness substantially less than the thickness of the adjacent wall of the container, and solder carried on the outer surface of said projection and adapted to flow upon the application of heat to the exposed surface of said depressed portion whereby to effect a solder bond between the key and the container without damaging the interior surface of the container wall.

3. A key opening container including a closure end secured to the body wall, a key for opening the container and adapted to be secured thereto, said key having a flattened shank portion, said shank portion having in one face thereof a small depressed portion providing on the opposite face thereof a small depending projection of a reduced wall thickness substantially less than the thickness of the adjacent wall of the container, and solder carried on the outer surface of said projection and adapted to flow upon the application of heat to the exposed surface of said depressed portion whereby to effect a solder bond between the key and the container without damaging the interior surface of the container wall.

JOHN COYLE.